United States Patent
Wessel et al.

[11] 3,766,955
[45] Oct. 23, 1973

[54] PROTECTIVE MESH FABRIC FOR VEHICLE TIRES

[75] Inventors: Karl-Heinz Wessel, Belecke-Mohne; Herbert Sobota, Warstein, both of Germany

[73] Assignee: Siepmann-Werke K.G., Belecke/Mohne, Germany

[22] Filed: May 17, 1972

[21] Appl. No.: 253,926

[30] Foreign Application Priority Data
July 29, 1971 Germany.................. P 21 37 944.2

[52] U.S. Cl.............................. 152/171, 152/243
[51] Int. Cl............................................ B60c 27/00
[58] Field of Search................. 152/185, 179, 170, 152/171, 243, 180, 222

[56] References Cited
UNITED STATES PATENTS
1,670,528   5/1928   Carpenter........................... 152/243
2,223,942   12/1940  McKinnon........................... 152/243
3,426,823   2/1969   Rieger................................. 152/171
3,602,285   8/1971   Siepmann........................... 152/171
3,630,256   12/1971  Siepmann........................... 152/171

Primary Examiner—Gerald M. Forlenza
Assistant Examiner—Richard A. Bertsch
Attorney—Michael S. Striker

[57] ABSTRACT

A protective mesh fabric for surrounding the surface of a vehicle tire is composed of a plurality of interlinked units each having a circumferentially complete annular first member provided with an aperture, a substantially U-shaped second member whose legs are to be inserted into the aperture from one side, and a substantially G-shaped third member whose legs are to be inserted into the aperture from the other side, with a hook-shaped arresting portion being provided on the third member which arrests the second and third members and prevents their undesired withdrawal from the aperture of the first member.

15 Claims, 7 Drawing Figures

PATENTED OCT 23 1973

PROTECTIVE MESH FABRIC FOR VEHICLE TIRES

BACKGROUND OF THE INVENTION

The present invention relates generally to a mesh fabric and more particularly to a protective mesh fabric for surrounding the surface of a vehicle tire.

Such mesh fabrics serve a two-fold purpose namely on the one hand to protect a vehicle tire against damage and on the other hand to increase the resistance of the vehicle tire to slipping or sliding. They are not intended to replace so-called tire-chains which are provided for the purpose for increasing the traction of a vehicle tire on slippery or icy surfaces. Instead, protective mesh fabrics of the type under discussion are intended to protect the vehicle tire against damage and to prevent its slipping under circumstances where entirely different conditions prevail, for instance they are to be used in conjunction with vehicle tires which are used on heavy tractors, loaders, or the like and where the tires must be capable of use on extremely rough terrain where they might become damaged by sharp rocks or tend to slide because of loose rocks.

Protective mesh fabrics for the purposes here described are already known in the art. They are, as already suggested above, used on vehicles where the tires must be protected against damage from the terrain on which the vehicle is to be utilized and it will be understood that such tires will frequently be more than man's high in diameter, in keeping with the frequently very great weight of the vehicle with which they are to be used. According to the prior art the mesh fabric is composed of three strips one of which surrounds the tread face of the tire and two of which surround the respective lateral side faces of the tire. The mesh fabric is composed of a plurality of interlinked elements which are so configurated that they can be interengaged merely by relative displacement, and can be retained in such position without having to undergo deformation, welding or the like, to assure that such interengagement cannot be terminated unintentionally. Experience has shown that the assembly of a mesh fabric according to the prior art requires a time which is at most equal to one third of the time required for assembling other prior art fabrics or chains in which deformation of the constituent components, or welding thereof, is required in order to maintain them in engaged position. Evidently, the simple pushing-together of the components is simpler and quicker than the heretofore interengagement, bending, welding and de-burring which was known from the prior art prior to the development of the aforementioned prior-art mesh fabric. Of course, an additional advantage is the fact that the relatively complicated and expensive devices and arrangements required for the bending of the components, their welding and their de-burring are eliminated, as well as the energy requirements for operating such equipment. Also, due to the complete elimination of welding operations, the aforementioned prior-art protective mesh fabric can be made in its constituent components of virtually any suitable steel, whereas the selection of steel was previously limited by the welding characteristics thereof. This makes it possible to use steels which are particularly resistant to breakage and/or wear but which would not be suitable if welding were required, because of their poor welding characteristics.

Thus, the aforementioned prior art protective mesh fabric is composed of a plurality of constituent components which are produced in the form in which they are finally used, and some of which are circumferentially complete whereas others are circumferentially incomplete. These are then interengaged with one another, which can be carried out very rapidly, and of course the components can be disengaged with similar rapidity if and when necessary or desired. Not only does this make it possible to rapidly assemble a protective mesh fabric of any required size, but it also enables the rapid replacement of damaged or worn individual components, simply by removing them from the fabric and replacing them with new ones without having to resort to any deformation of any of the components, or to any welding thereof. Because of this, the replacement of components can be carried out anywhere, rather than having to be carried in a workshop or a factory, and there is no damage or weakening of adjcent or cooperating components to be expected. Also, the prior-art construction permits the assembly of a mesh fabric in which the interstices can be of different configurations and can be larger or smaller depending upon the manner in which the constituent components are assembled.

It has, however, been found, that it is desirable to improve still further the versatility and operating characteristics of such protective mesh fabrics.

SUMMARY OF THE INVENTION

Accordingly, it is a general object of the invention to provide such an improved protective mesh fabric for surrounding the surface of the vehicle tire.

More particularly, it is an object of the present invention to provide such a protective mesh fabric which has an even greater life expectancy than the one mentioned above with respect to the prior art.

An additional object of the invention is to provide such an improved protective mesh fabric which is capable of withstanding even greater loads than what is known from the prior art.

An other object of the invention is to provide such an improved mesh fabric which is even more reliable and still safer in use.

Still an other object is to provide such an improved mesh fabric in which the above-mentioned advantages are obtained without having to resort to additional components.

Still a concomitant object of the invention is to provide such a protective mesh fabric in which the interengagement of the constituent components which make up the respective units which, interlinked with one another, together constitute the mesh fabric itself, is such that even in the event of breakage or significant wear of individual components, the defect which develops will remain limited to the particular location and will not cause any damage to other parts of the fabric.

In pursuance of these objects, and of others which will become apparent hereafter, one feature of the invention resides in a protective mesh fabric for surrounding the surface of a vehicle tire, such mesh fabric, comprising, briefly stated, a plurality of interlinked units each of which is composed of a circumferentially complete annular first member adapted to extend substantially normal to the tire surface, and at least one approximately U-shaped second member adapted to extend substantially parallel to the tire surface. The first member is provided with aperture means and has an engaging portion which in part bounce the aperture means. The second member has two legs and is provided on one of these legs with an arresting portion configured for mating engagement with the engaging portion of the first member subsequent to insertion of the one leg through the aperture means and in a sense preventing relative displacement of the aforementioned members in the general plane of the aperture means.

It is specifically pointed out that when mention is made herein of a protective mesh fabric this is intended to exclude chain configurations which are composed of a string or strand of interengaging links. Instead, the term mesh fabric refers to a mesh or net. It is also pointed out that when the second member is designated above, as being approximately U-shaped, this is intended to include a substantially G-shaped configuration, for which reason the term "approximately" has been employed to make it clear that U-shaped can embrace such other configuration.

In the construction according to the present invention separate and readily lost components for retaining the interlinked elements together are avoided. Moreover, such components would in actual use of the protective mesh fabric be subjected to particularly high stresses and wear and would readily be destroyed or become lost. Instead, the protective mesh fabric according to the present invention assures that the cooperating components or members of the respective interlinked units will remain in their respective positions exclusively due to their configuration. This has the additional advantage that it makes it impossible to assemble the members of any unit in other than the proper relationship, and moreover, the retention and securing of the members against undesired separation will take place necessarily when the members are assembled with one another to make a unit.

Although there must be some slight play in the first member for insertion of the second member, and of a third member which is also of substantially U-shaped configuration and preferably provided in conjunction with the second member, the second member will automatically cause an arresting of both of itself and the third member against undesired withdrawal from the first member and even if a member belonging to an interlinked adjacent unit should be absent, for instance due to damage or destruction, the disengagement of the first, second and third members from one another is precluded to the extent that unintentional and undesired disengagement cannot take place. This means that damage or destruction of any one member cannot result in disintegration of other parts of the mesh fabric due to a chain reaction of undesired separations.

It will be appreciated that this provides for a particularly advantageous construction, especially in view of the fact that even if damage to any one member should occur, the adjacent members cannot be subjected — because they remain in their original positions relative to one another — to impermissibly high forces which could result in permanent deformations or in destructions of these members. Thus a mesh fabric according to the present invention can be subjected to substantially higher permissible loads or stresses than the prior-art mesh fabric which has been described above and over which the mesh fabric according to the present invention constitutes an improvement. At least the open or circumferentially incomplete members, which in a mesh fabric of the type here under discussion must be considered the weakest elements, can now be subjected to stresses which are between four and six times greater than stresses permissible for similar elements in the prior-art.

It is particularly advantageous according to the present invention if as already suggested above, the second member is of substantially G-shaped configuration, that is if it has the contour of a stylized G. A thus configurated member can be forged particularly readily and has no portions which would be weakened by having to undergo bending, welding, or other operations beyond the forging operation.

The arresting portion is advantageously configurated as a hook-shaped portion which extends from one leg of the second member towards but short of the other leg, being located in the general plane of the second member. The aperture means in the first member is in form of two keyhole-shaped apertures separated by a bridge portion, with each such aperture having a wider portion and a narrower portion and with the hook-shaped portion having a thickness which permits its accommodation in a respective one of the narrower portions. The other leg, and the arms of the also substantially U-shaped third member, are provided at their respective free ends with coupling portions of essentially hammer-head-shaped configuration.

It is particularly advantageous if one arm of the third member is provided with a projection which extends inwardly towards the other arm and thus faces the hook-shaped arresting portion when the arms are inserted into the aperture means of the first member from one side and the legs from the other side. This engaging or abutment portion is advantageously so configurated that when the arms and legs are all inserted into the aperture means, transverse movement of the first member on the one hand and second and third members on the other hand, relative to one another and in the general plane of the aperture means is entirely or substantially precluded. This means that in this manner the third member which is not provided with hook-shaped arresting portion, is nevertheless reliably retained against transverse displacement with reference to the first member and against removal from the latter. Because of this construction it is possible to maintain between the hook-shaped arresting portion and the other leg of the second member a sufficient distance to permit the bridge portion of the first member readily to pass through the remaining gap.

The first member is essentially flat and substantially oval in configuration, and when, as is advantageous, the aperture means thereof is provided in form of two substantially key-hole-shaped apertures separated by the bridge portion, the wider sections of each aperture permit insertion of the respective arms or legs and narrower sections have a sufficient dimension to permit them to accommodate portions of one arm and one leg laterally adjacent one another. The bridge portion which constitutes the arresting portion advantageously has a width corresponding to substantially between one quarter and one third of the distance between the arms of the third member or the legs of the second member, and because of the incorporation of the bridge portion with the substantially G-shaped second member, a very reliable and in effect automatic (upon insertion of the arms and legs into the apertures) retention of the second and third members against withdrawal from the apertures of the first member is obtained. Thus, aside from the necessary small play between the connected first, second and third members any larger transverse relative displacement of the second and third members with reference to the first member are precluded, even if wear or breakage of one of the members of a unit composed of the three members should result in the provision of more lateral space than is originally provided.

According to the invention it is also advantageous if the outer side of the hook-shaped arresting portion, that is the side thereof which faces the other leg of the second member, extends at most slightly beyond the mid point between the legs. The space between this outer side and the other leg should be at least slightly larger than the transverse dimension of the bridge portion of the first member so that the bridge portion can pass through this space.

The depth of the hook recess should advantageously correspond to between substantially one quarter and one fifth of the length of the legs, that is of the depth of the recess defined in the second member between the legs thereof. Advantageously this depth is approximately equal to or slightly greater than the thickness (as opposed to the width) of the bridge portion. In this manner, the components which make up an interlinked unit have the smallest possible configuration, resulting of course in increased stability of the components or members and permitting, inter alia, greater exertion of stresses on a protective mesh fabric made according to the present invention. At the same time this assures that the interlinking, that is the connection of the members with one another, can be effected in a very simple manner, and that the various members are held with reference to one another in positions which permit them to be subsequently readily to be disengaged if and when desired.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
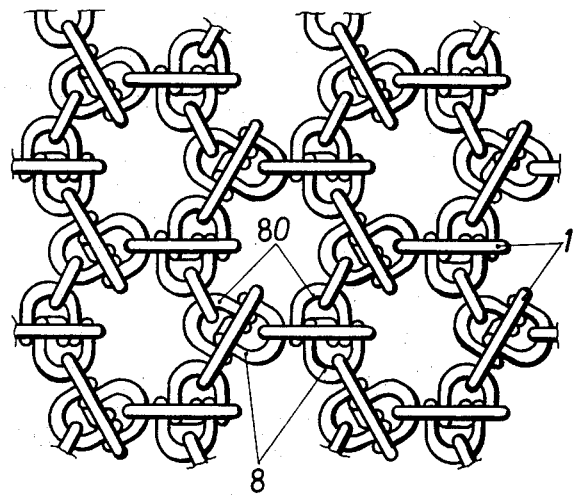
FIG. 1 is a fragmentary top plan view illustrating a portion of a protective mesh fabric according to the present invention.

Referring firstly to FIG. 1, it will be seen that the protective mesh fabric according to the present invention is composed of a plurality (only some shown) of interlinked units, each of which is composed of two, or as is preferable and illustrated in the drawing, of three cooperating members. Such a mesh fabric will usually be composed of tread strip which entirely circumferentially surrounds the outer surface of a tire and of two lateral strips which extend to opposite sides of the tread strip and each surround one side face of the vehicle tire. Any or all of these strips can be composed of the units as illustrated in FIG. 1.

Of course, it will be appreciated that for instance the non-illustrated side strips (only a portion of a tread strip has been shown in FIG. 1) could be connected with the tread strip with conventional chain links or with other elements not configurated in accordance with the present invention, should this be desired.

Figure 2:
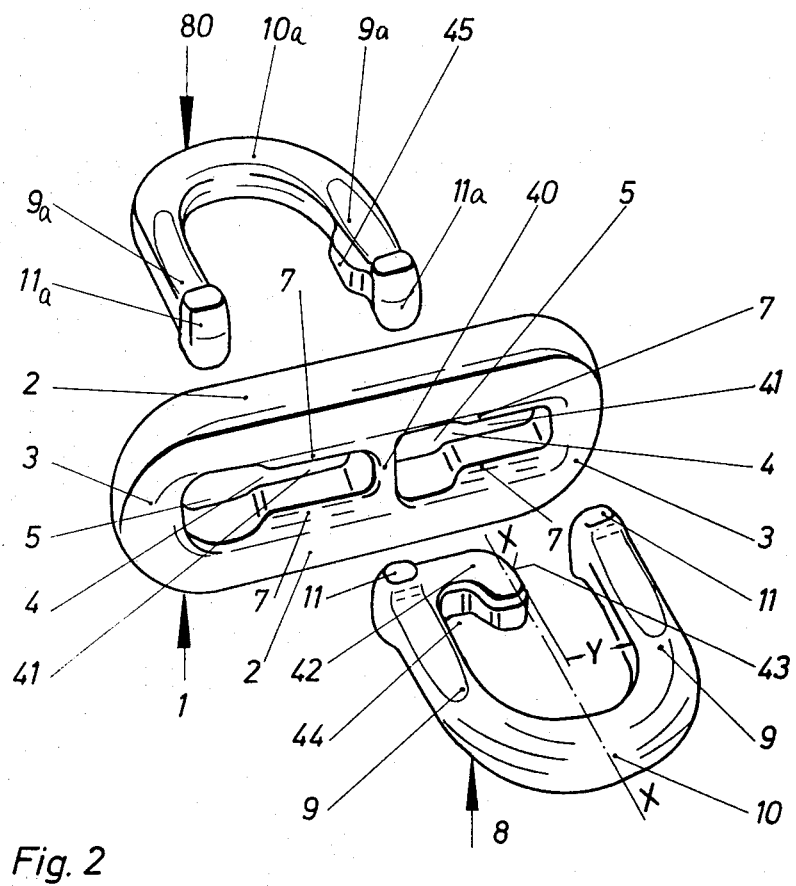
FIG. 2 is a detail view illustrating three members of one of the interlinked units of which the mesh fabric of FIG. 1 is assembled, in perspective view and in an exploded showing.

FIG. 2 shows the three elements of which the various interlinked units making up the mesh fabric of FIG. 1, are composed. In FIG. 2, where the unit is shown as being in preferred manner composed of three of these members, it will be seen that there is provided a first member 1 which is essentially flat and substantially oval, that is circumferentially complete and annular. A second member 8 is provided which is essentially of the outline of a stylized G, and a third member 80 of U-shaped outline completes the elements which make up a unit.

The general plane of the member 1 of each unit will extend substantially normal to the surface of a vehicle tire when the mesh fabric is placed about the same, whereas the general plane of the members 8 and 80 will extend in substantial parallelism with this surface. The members 1, 8 and 80 are forgings and each has a configuration and a size which permits interengagement of the member 1, or of one of the members 8 or 80, with one of the members of a respectively adjacent interlinked unit in order to obtain the interlinked mesh fabric of FIG. 1. Of course, such interengagement can also be effected with elements which are configurated other than in accordance with the present invention, for instance with the conventional chain links mentioned above, if that should be desired.

It will be appreciated that the member 1 of each unit constitutes both the coupling member and the support member, and for this reason its general plane extends substantially normal of the tire surface on which a mesh fabric according to the present invention is mounted. The length of the member 1 is approximately two and a half times to three times as great as its width, that is its dimension measured in the direction normal to the surface of the tire. Consequently, the member 1 is in form of an elongated oval, having longitudinal portions 2 which are connected at opposite ends by curved portions 3. Located slightly off center with respect to the mid point of the elongation of the member 1, the portions 2 are connected by a bridging portion 40 which constitutes an engaging portion cooperating with the member 8. The portion 40 separates two substantially keyhole-shaped apertures 4 each of which has a wider aperture section 5 and an approximately twice as long narrower aperture section 41. Above and below the sections 41 there are provided abutment and supporting surfaces 7.

The member 8 constitutes in effect an arresting and retention member, whereas the member 80 constitutes a counter member which cooperates with the member 8. The member 8 has two arms 9 and the member 80 has two arms 9a. The arms 9 are connected by a curved portion 10 of substantially circular cross section and the arms 10a are similarly connected by the portion 10a. The free ends of the legs 9 and of the arms 9a are provided with hammerhead-shaped projections 11 and 11a, respectively, which extend transversely to the general plane of the members 8 and 80. The configurations of the projections 11 and 11a are so selected that they can pass through the aperture portions 5 and will engage the surfaces 7 when they are shifted into the aperture portions 41, with the projections 11 being located at one side of the member 1 and the projections 11a at the opposite side thereof.

The leg 9 of the member 8 which in the assembled condition of the three members will be located between the arms 9a of the member 80, is provided with a hook-shaped arresting portion 42 located in the general plane of the member 8 and extending towards the other leg 9 of the latter. The thickness of the portion 42, measured in direction normal to the general plane of the member 8, corresponds approximately to the height of the aperture portions 41, or is slightly smaller than that height. In other words, the thickness of the portion 42 is slightly smaller than the thickness of the leg 9 on which it is provided. FIG. 2 shows clearly that the outer side of the portion 42, that is the side which faces the other leg 9, extends either only to or at most slightly beyond the midpoint X—X between the legs 9 of the member 8. The distance Y between this outer side and the other leg 9 (see FIG. 2) — the outer side is designated with reference numeral 43 — is at least equal to the cross-sectional diameter of the portions 3 of the member 1.

The depth of the recess in the hook-shaped portion 42, measured in parallelism with the line X—X of FIG. 2, corresponds to approximately one quarter — one fifth of the depth of the recess in the member 8 between the legs 9 thereof, that is as measured along the line X—X. This latter dimension, in turn, corresponds substantially to the overall dimension of the member 8, measured in direction normal to the line X—X, that is between the outer sides of the legs 9. The depth of the recess 44 in the hook-shaped portion 42 is advantageously equal to and slightly greater than the thickness of the bridge portion 40 and may for instance be between equal to between 0.8 - 1.2 times the thickness of the portion 40.

Coming to the member 80 it will be seen that the arm 9a which will be located adjacent the outer side 43 of the portion 42 when the members 8 and 80 are assembled with the member 1, has an inwardly extending projection 45 which extends towards the outer side 43 of the portion 42 and which, when the members 8 and 80 are assembled with the member 1, will abut against the outer side 43 and prevent excessive play. The normal thickness of the legs 9 or arms 9a is smaller than the distance between the outer side 43 and the leg 9 so that portions of adjacent members 1, 8 or 80 (which are to be linked with the respective unit) can be readily inserted into this space.

Figure 3:
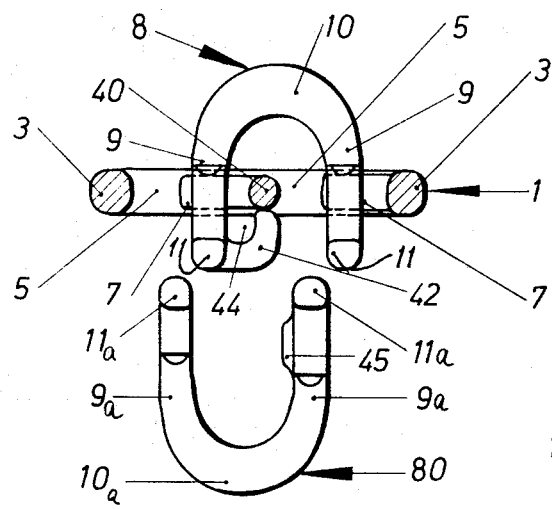
FIG. 3 is a view which is turned through 180° with respect to FIG. 2, and in which two of the three members of FIG. 2 have been assembled in part.
Figure 4:
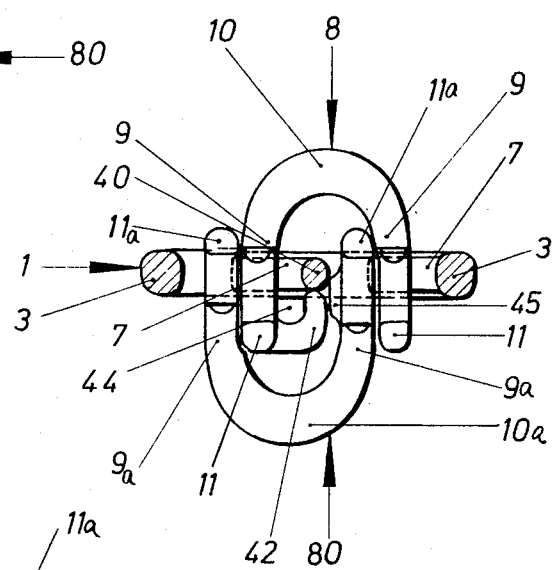
FIG. 4 is a view similar to FIG. 3 showing the third member in part assembled with the two members of FIG. 3.
Figure 5:
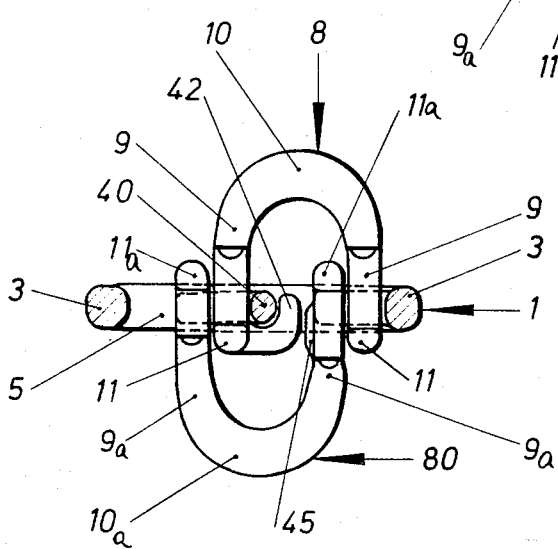
FIG. 5 is a view similar to FIG. 4, showing the final position of the three members when they have been assembled with one another.
Figure 6:
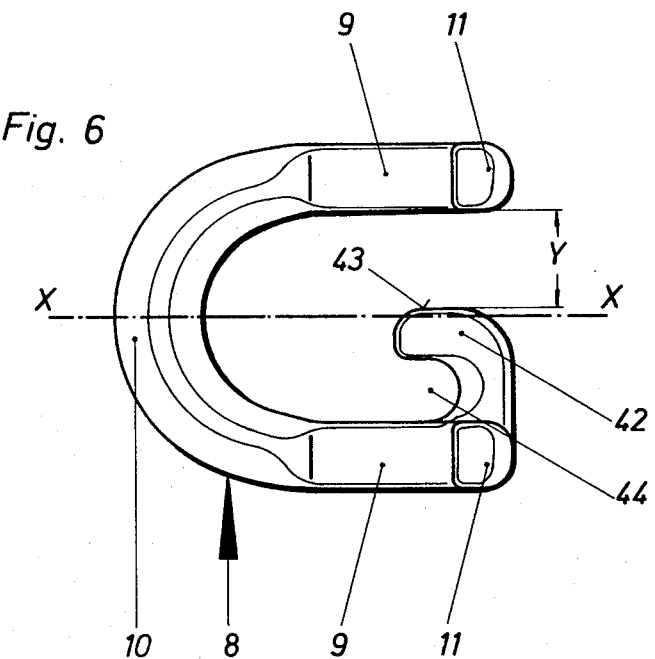
FIG. 6 is a top plan view of the second members of the units in FIGS. 2 – 5.
Figure 7:
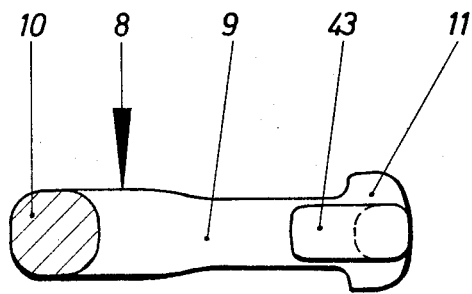
FIG. 7 is a section taken on line X—X of FIG. 6.

Reference to FIGS. 3 - 5 will show how the members of FIG. 2 are assembled with one another to form a unit which of course will be interlinked with adjacent units in order to obtain the protective mesh fabric of FIG. 1. Let it be assumed, for instance, that members 1 of adjacent units have been hooked over the members 8 and 80 shown in FIG. 3, and that now the members 8 and 80 are to be connected with the illustrated member 1 of that Figure. To achieve this the members 8 and 80 are moved towards one another from opposite sides of the member 1. First, the member 8 is inserted with its portions 11 through the wider aperture portions 5, whereupon the member 8 is laterally displaced to such an extent that the outer surface of the bridge portion 40 is in abutment with the hook-shaped arresting portion 42. The wider aperture portions 5 are now again unobstructed and permit insertion of the projections 11a on the arms 9a of the member 80. The members 8 and 80 are now farther displaced in direction of the aperture portions 41 until the projecting nose of the hook-shaped portion 42 enters into the wider aperture portion 5 which is located adjacent the bridge portion. In this position, the projection 45 abuts against the outer side 43 of the hook-shaped portion 42 with slight play, and thus both of the members 8 and 80 are connected with the bridge portion 40 and thus with the member 1 and in such a manner that when even slight tension is exerted upon them, as is the case when the mesh fabric is placed onto a vehicle tire, lateral displacement of the members 8 and 80 with respect to the member 1 or vice versa is impossible. The sequence of assembly is clearly evident from FIGS. 3 - 5, and the particular configuration of the member 8 is clearly shown in FIGS. 6 and 7 in detail. When the assembly stage in FIG. 5 is reached, that is the final assembly position, the aperture portion 5 through which the hook-shaped arresting portion 42 was originally inserted is now unobstructed and permits the insertion of a member 8 or 80 of an adjacent unit which is to be interlinked with the one that has been just assembled. Once this is done, the members of the adjacent unit are then similarly assembled in the manner just described with respect to FIGS. 3 - 5.

It is clear that by simply continuing these assembly operations, a protective mesh fabric such as illustrated fragmentarily in FIG. 1 can be readily assembled to a desired size and configuration. If, now, for any reason the member 8 or 80 of an adjacent unit which has been inserted for interlinking purposes with the unit as shown in FIG. 5, in the manner just discussed above, should break or should receive excessive play due to substantial wear, this does not result in freedom of the members 8 and 80 of the unit of FIG. 5 for lateral or transverse displacement with respect to their associated member 1. Rather, even under such circumstances the members 8 and 80 in FIG. 5 remain in their position shown in that Figure with respect to the associated member 1 and are reliably retained in this position, so that the wear or breakage of the member of the adjacent unit which originally coupled that unit with the unit shown in FIG. 5, does not lead to a sequence of events resulting in the eventual disassembly or destruction of a larger portion or all of the mesh fabric.

It will be understood that each of the elements described above, or two or more together, may also find a useful application in other types of constructions differing from the types described above.

While the invention has been illustrated and described as embodied in a protective mesh fabric for surrounding the surface of a vehicle tire, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A protective mesh fabric for surrounding the surface of a vehicle tire, comprising a plurality of interlinked units each composed of a circumferentially complete annular first member adapted to extend substantially normal to the tire surface, and at least one approximately U-shaped second member adapted to extend substantially parallel to the tire surface, said first member having aperture means and an engaging portion in part bounding said aperture means, and said second member having two legs and being provided on one of said legs with an arresting portion configured for mating engagement with said engaging portion subsequent to insertion of said one leg through said aperture means and in a sense preventing relative displacement of said members in the general plane of said aperture means.

2. A protective mesh fabric as defined in claim 1, wherein each of said units further comprises a third member of substantially U-shaped configuration and provided with two arms having coupling portions, said legs of said second member and said arms of said third member being insertable into said aperture means from opposite sides of said first member, said coupling portions releasably engaging with said legs of said second member for preventing unintentional withdrawal of said legs and arms from said aperture means.

3. A protective mesh fabric as defined in claim 2, said engaging portion being a portion of said first member and extending across said aperture means, subdividing the same into two apertures of substantially keyhole shaped configuration.

4. A protective mesh fabric as defined in claim 2, wherein said second member is of substantially G-shaped outline.

5. A protective mesh fabric as defined in claim 3, wherein said arresting portion is of hook-shaped configuration and extends from said one leg towards but short of the other of said legs.

6. A protective mesh fabric as defined in claim 5, said second member having a general plane, and said arresting portion being at least substantially located in said general plane.

7. A protective mesh fabric as defined in claim 5, said apertures each having a wider aperture portion and a narrower aperture portion; and wherein said arresting portion has a thickness which is only slightly smaller than said narrower aperture portion.

8. A protective mesh fabric as defined in claim 5, said hook-shaped arresting portion having an outer side facing towards said other leg, and one of said arms of said third member being received between said outer side and said other leg with the coupling portion of said one arm projecting towards said outer side.

9. A protective mesh fabric as defined in claim 8, said coupling portion of said one arm being so configurated as to at least substantially prevent relative movement of said second and third members in said general plane of said aperture means when said one arm and said coupling portion thereof are located between said outer side and said other leg.

10. A protective mesh fabric as defined in claim 3, each of said apertures having a wider aperture portion and a narrower aperture portion, each of said wider aperture portions being dimensioned to permit insertion of one of said legs and one of said arms, and each of said narrower aperture portions being dimensioned to accommodate one of said legs and one of said arms upon relative displacement of said first member on the one hand, and said second and third members on the other hand, in said general plane of said aperture means.

11. A protective mesh fabric as defined in claim 10, said engaging portion having a width corresponding to between substantially one-third to one-quarter of the distance between said arms and said legs, respectively.

12. A protective mesh fabric as defined in claim 3, wherein said arresting portion is of hook-shaped configuration and extends from said one leg towards the other of said legs, but at most slightly beyond the midpoint between said legs.

13. A protective mesh fabric as defined in claim 12, said arresting portion having an outer side facing towards said other leg; and wherein the distance between said outer side and said other leg is at least slightly greater than the dimension of said engaging portion intermediate said two apertures.

14. A protective mesh fabric as defined in claim 13, said arresting portion having a first section extending from said one leg towards said other leg, and a second section extending transverse to said first section and in substantial parallelism with said legs; and wherein said second section extends from said first section by a distance which is equal to between substantially one-quarter and one-fifth the length of said legs.

15. A protective mesh fabric as defined in claim 14, wherein said distance by which said second section extends from said first section is at least equal to the thicknesss of said arresting portion in direction normal to said general plane of said aperture means.

* * * * *